A. MACKENZIE.
CHILD'S OR TOY VEHICLE.
APPLICATION FILED JULY 19, 1915.
1,197,752.
Patented Sept. 12, 1916.
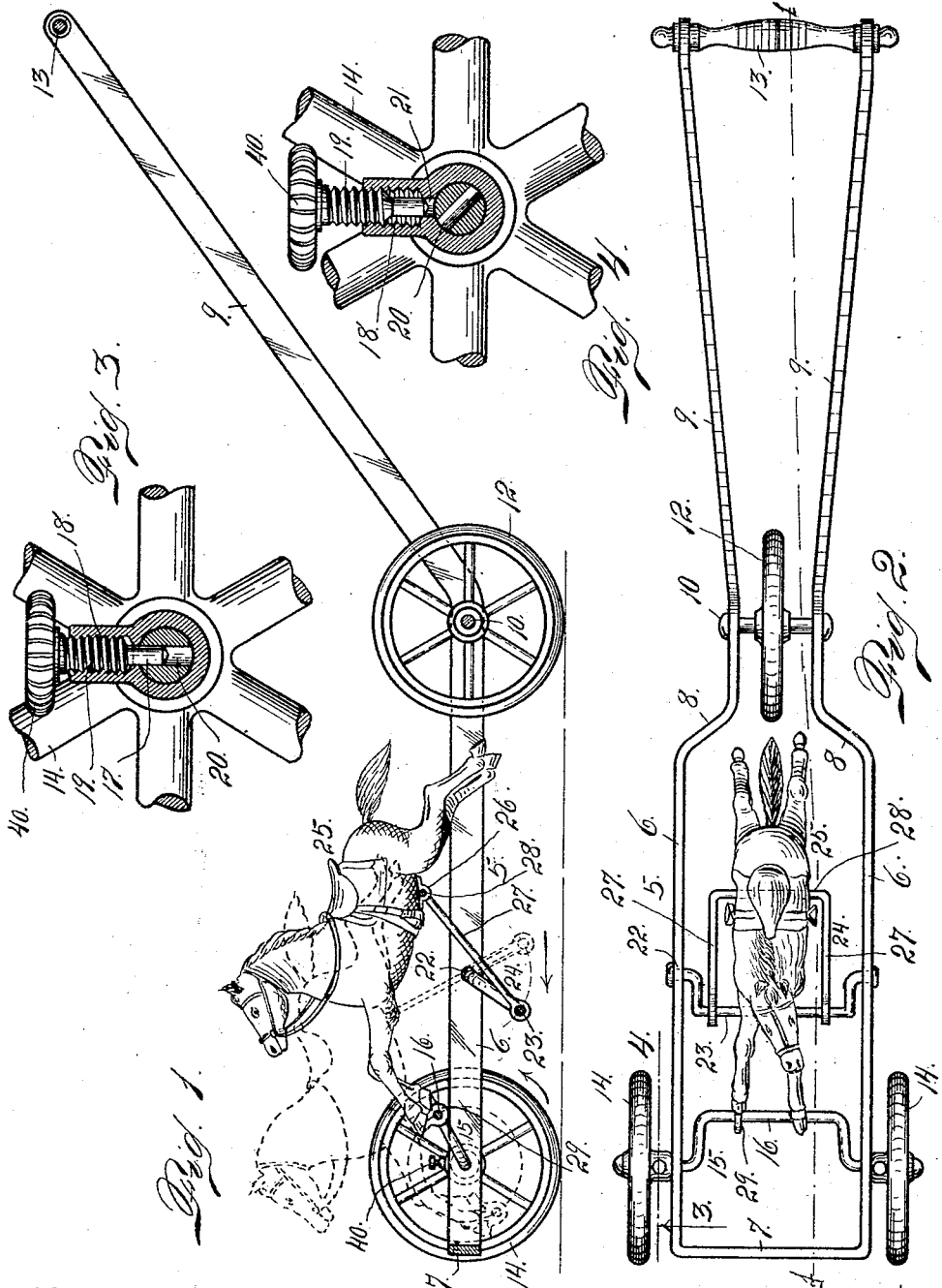
Witnesses
Otto E. Hoddick
John B. Cade
Inventor
Archibald Mackenzie
By
Attorney

UNITED STATES PATENT OFFICE.

ARCHIBALD MACKENZIE, OF DENVER, COLORADO.

CHILD'S OR TOY VEHICLE.

1,197,752.  Specification of Letters Patent.  Patented Sept. 12, 1916.

Application filed July 19, 1915. Serial No. 40,611.

*To all whom it may concern:*

Be it known that I, ARCHIBALD MACKENZIE, a citizen of the United States, residing at the city and county of Denver and State of Colorado, have invented certain new and useful Improvements in Children's or Toy Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in vehicles which may be used either as toys or of such size as to form a carriage for any child requiring an article of this class. It is probable that the greatest use for the device will be by children, of such size that they usually ride in small carriages or wagons. The article consists of a wheeled support upon which an object preferably representing a horse is mounted, in such a manner that as the vehicle is moved, the horse will be given a loping movement similar to the performance of a real horse. The riding member of the structure has its front part as the front feet connected with a crank formed in the forward axle of the vehicle while the rear part is supported from a crank shaft journaled in the frame work of the vehicle in the rear of the front axle, and adapted to oscillate. The front wheels are secured to the front axle, so that as the vehicle is moved thereby the front wheels will be caused to rotate, the front axle will be turned, and by virtue of the crank therein, will impart the loping movement to the horse, the rear crank shaft support, in the meantime oscillating as may be required to coöperate with the rotary front shaft, introducing the loping performance of the horse. The child assumes a position upon the horse as in riding a real horse or playing with a rocking horse.

Having briefly outlined my improved construction, I will proceed to describe the same in detail, reference being made to the accompanying drawing, in which is illustrated an embodiment thereof.

In this drawing, Figure 1 is a sectional side elevation of my improved device. In this view the section is taken on the line 1—1, Fig. 2, the riding member being shown in elevation. Fig. 2 is a top plan view of the same. Fig. 3 is a section taken on the line 3—4, Fig. 2, viewed in the direction of the arrow. Fig. 4 is a similar view, but showing the parts in different relative positions.

The same reference characters indicate the same parts in all the views.

Let the numeral 5 designate the body of the vehicle which is approximately rectangular in shape and preferably composed of metal. In the embodiment shown in the drawing, this frame 5 consists of parallel side members 6 suitably spaced. These members are connected in front by a transverse member 7, while they merge by rear inward bends 8 into upwardly and rearwardly inclined handle parts 9 which as illustrated diverge slightly from the rear axle 10 on which is mounted a single rear wheel 12 which forms a support for the frame work in the rear of the horse. The rear extremities of the handle part 9 are connected by a hand piece 13 for convenience in manipulating the vehicle.

The forward part of the structure is supported by two wheels 14 which are made fast to the outer extremities of the front axle 15 having a centrally located crank 16. As shown in the drawing the hubs of the wheels are locked to the axle by means of screw pins 17 which are threaded into the upper socket parts 18 of the hub by means of a threaded portion 19. The upper extremity of this screw pin is equipped with a milled head 40 of suitable size for convenient manipulation. The pin member proper of this device is reduced in diameter and enters a perforation 20 formed in the axle, when the wheel and axle are properly adjusted to bring perforations 21 in the hub into register with the corresponding perforations 20 in the axle. In this manner it is preferred to lock both front wheels 14 to the axle 15, so that as the vehicle is caused to move upon the ground or other surface, the front axle is caused to rotate.

In the rear of the front axle and journaled in the side members 6 of the structure, is a crank shaft 22 whose crank 23 occupies a position intermediate the side bars 6 and is connected by means of a link 24 with the body of the horse 25 as shown at 26. The link 24 is composed of parallel side arms 27 whose lower extremities are perforated to receive the crank 23 of the crank shaft 22. The upper extremities of the arms 27 are connected by a transverse member 28 which is journaled in the bearing 26 preferably located at the rear part of the body of the horse forward of the rear legs. The front feet or one of them is pivotally connected as shown at 29 with a crank 16 of the front axle.

From the foregoing description it will be understood that as the vehicle is moved upon the ground or other surface whereby the wheels 14 are caused to rotate, the forward axle will be rotated and by virtue of its crank 16, will impart a forward and rearward movement to the riding member of the device, the body of the horse being given an action somewhat resembling the loping of a live animal when ridden. In other words assuming that the horse is in the full line position in Fig. 1 and that the vehicle is being moved forwardly or in the direction of the arrow in said figure, the body of the horse will be carried first upwardly, after which the front part will be carried downwardly as the crank 16 moves from the highest position to the position shown by dotted lines in Fig. 1. Then as the crank 16 moves below the axis of the front axle and rearwardly to the position shown by full lines in Fig. 1, a complete loping movement will have been accomplished. The link 24 serves to impart coöperating movement to the rear portion of the body of the horse, while the front axle is imparting the described movement to the front part. It is evident that a vehicle of this character will prove very attractive to children for the reason that the movement of the horse member of the structure is similar to that of a live horse when ridden as heretofore described.

It is evident that the invention may be modified so far as the details are concerned without in any way departing from the spirit of the invention.

In the event that it is desired to use the structure without moving it upon its wheels, the screw pins may be loosened or screwed outwardly sufficiently to disengage the pin portions 17 from the perforations in the axle (see Fig. 4). In this event the crank of the front axle will assume the lowermost position, and will coöperate with the crank 23 of the crank shaft 22 to form a swinging support for the horse or animal member of the structure, which will make it practicable for a child to move the horse back and forth on the two cranks which will form a swinging support for the horse whose body may be oscillated upon the frame by means of such support in a manner somewhat on the principle of a swing. This is simply another and possible use to which the article may be put, being a use somewhat similar to that of a rocking horse, except that in the present case the riding member of the structure is oscillated on its forward and rearward crank shafts as supports. Furthermore assuming that the front axle of the vehicle is loosened from the hubs of the wheels, it is evident that a motor might be connected with this front axle to rotate the latter, whereby the same movement could be imparted to the horse or animal member of the device, as when the wheels 14 are rotated. Further by mounting the body 6 of the framework upon stationary supports whereby the wheels, particularly the front wheels would be raised from contact with the surface below, power may be applied to either front wheel to rotate the same, whereby the loping movement would be imparted to the animal member of the structure assuming that the power wheel is fast on the front axle. This power might be manual or motor as preferred.

Having thus described my invention, what I claim is,—

1. A child's vehicle comprising a frame, a riding member, an axle having a crank with which the forward part of the riding member is pivotally connected, a link connection between the rear part of the riding member and the frame, and means for rotating the crank axle.

2. The combination of a frame member, a riding member, an axle having a crank, means for rotating the axle, a pivotal connection between the said crank and one end of the riding member, and a link connection between the frame member and the other end of the riding member.

3. The combination of a frame, an axle journaled therein and having a crank, wheels engaged by the axle one at least of said wheels being fast on the said axle, the axle being provided with a crank, a riding member whose forward part is pivotally connected with the said crank, and a connection between the rear part of the riding member and the frame to coöperate with the connection between the front of the riding member and the crank of the axle.

4. The combination with a frame, of a crank axle journaled therein, a riding member having its forward part operatively connected with the crank of the axle, means for rotating the axle to impart rotary movement to the front part of the riding member, and an oscillatory support for the rear part of the riding member.

5. In a vehicle the combination of a frame mounted on wheels, a crank axle to which at least one wheel is made fast, a riding member whose front part is pivotally connected with the crank of said axle to rotate with the same, and an oscillatory connection between the frame of the vehicle and the rear part of the riding member.

6. In a vehicle the combination of a frame mounted on wheels, a crank axle to which one wheel at least is made fast, a riding member whose front part is pivotally connected with the crank of said axle, an oscillatory connection between the rear part of the riding member and the frame, and means for rotating the wheel secured to the crank axle.

In testimony whereof I affix my signature in presence of two witnesses.

ARCHIBALD MACKENZIE.

Witnesses:
 BESS MITCHELL,
 A. J. O'BRIEN.

Copies of this patent may be obtained for five cents each, by addressing the "Commissioner of Patents, Washington, D. C."